United States Patent [19]

Golland et al.

[11] 4,011,109
[45] Mar. 8, 1977

[54] METHOD FOR PRODUCING STEEL FILAMENTS

[75] Inventors: David I. Golland, Cary, N.C.; Charles J. Runkle, Guntersville, Ala.; Milan F. Kozak, Raleigh, N.C.; John A. Schey, Waterloo, Canada

[73] Assignee: Monsanto Company, St. Louis, Mo.

[22] Filed: Nov. 10, 1975

[21] Appl. No.: 630,595

[52] U.S. Cl. .............................. 148/12 B; 29/413; 29/414; 83/56; 148/12.4
[51] Int. Cl.² .......................................... C21D 9/52
[58] Field of Search ............. 148/12 B, 12.4; 83/56; 29/413, 414

[56] References Cited
UNITED STATES PATENTS 2,109,921 3/1938 Leach ........................... 29/DIG. 33
3,953,250 4/1976 Golland et al. ....................... 83/56

*Primary Examiner*—W. Stallard
*Attorney, Agent, or Firm*—Donald J. Fitzpatrick

[57] ABSTRACT

A method for producing steel filaments having a heat treated microstructure is disclosed. The method comprises the steps of providing a steel coil having a carbon content from about 0.30 to about 0.95, percent by weight, scoring the surface of the steel to form a plurality of grooves that delineate continuous longitudinal segments, heat treating the steel to develop an appropriate metallurgical structure, separating the segments into individual filaments by causing the steel to fracture at the grooves, and then passing the filaments through a mechanical straightener.

13 Claims, 1 Drawing Figure

METHOD FOR PRODUCING STEEL FILAMENTS

BACKGROUND OF THE INVENTION

1. Field of the Invention

This invention relates to a method for producing steel filaments and more particularly to a method for producing heat treated continuous lengths of steel filaments.

2. Description of the Prior Art

Steel filaments are conventionally manufactured by preparing a melt of a specific composition, casting the melt, thermomechanically working the cast product and finally some technique of further reduction in cross-sectional area such as rolling, swaging or drawing. Intermediate annealing is frequently required to restore ductility in order to achieve substantial reductions in area. Generally speaking this technique is quite expensive because of low product yield and the numerous processing steps required to ultimately arrive at the final cross-section.

An alternate method for producing steel filaments is disclosed in co-pending patent application, "Method For Producing Wire With a Small Cross Sectional Area", Ser. No. 519,364 and assigned to the assignee of this invention. In this application steel filaments are produced by slitting coil stock having a microstructure substantially free of proeutectoid ferrite into ribbons having an aspect ratio less than 25. To obtain certain mechanical properties the slit product is thereafter heat treated. It has been found that heat treating fine filamentary material is expensive.

As used herein the terms "ribbon" and "filament" may be interchanged and define a steel product having a small cross-sectional area, i.e., less than 0.005 sq. in. (0.03226 cm²) with a cross-section that may be square, rectangular or round.

In U.S. Pat. No. 2,074,714 a method is disclosed for making wire from sheet metal. Sheet metal is rolled through a grooving mechanism so as to provide channels on opposite sides of a sheet which define the wires to be produced. The channels are subsequently separated by passing the sheet through a shearing apparatus thereby providing wirelike elements of polygonal cross-section. The disclosed process is suitable for producing stock for welding rods. It is well known in the art that fatigue strength and other mechanical properties are not important considerations for such products.

The method of the present invention produces continuous lengths of steel filaments with a small cross-sectional area having a heat treated microstructure by separating into segments pre-scored and heat treated steel coil stock.

SUMMARY OF THE INVENTION

The present invention relates to a method for obtaining filaments or ribbons in continuous lengths from coils of heat treated light gage strip. This invention is particularly well suited for processing coil stock in black plate thicknesses, that is, less than 29 gage or thicknesses 0.0141 inches (0.0358 cm) and under.

The method of the present invention allows steel strip to be rapidly and economically converted into filaments. The invention comprises the following steps:

Providing a steel coil having a carbon content from about 0.30 to about 0.95, percent by weight; scoring the surface of said steel to form a plurality of grooves or channels that delineate continuous longitudinal segments; heat treating the steel to develop an appropriate metallurgical structure; separating the segments into individual filaments by causing the steel to fracture at the grooves or channels; and passing the filaments through a mechanical straightener.

It is therefore an object of this invention to provide a method for converting strip into continuous lengths of ribbon having a heat treated microstructure.

Another object of this invention is to provide a method for converting strip into continuous lengths of ribbon having a cross-sectional area less than 0.005 sq. in. (0.03226 cm²).

A further object of this invention is to provide a method for obtaining a plurality of filaments having a martensitic structure from steel coil stock.

Another object of this invention is to provide a method for obtaining ribbon having good fatigue resistance.

DETAILED DESCRIPTION OF THE PREFERRED EMBODIMENT

Figure 1:
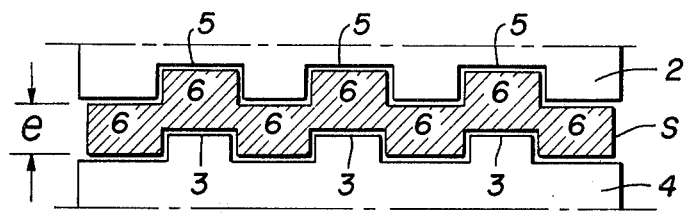
FIG. 1 is a front elevational view showing a pair of cutters forming a series of channels in the cross-section of steel strip.

The present invention provides a method for the production of essentially straight ribbon or filaments having a small cross-sectional area, a heat treated microstructure and good fatigue resistance. The method for the production of such ribbon or filaments comprises the steps of:

a. providing a coil of steel having a carbon content from about 0.30 percent to about 0.95 percent by weight of carbon, b. scoring the surface of the steel to form a plurality of channels or grooves that delineate continuous longitudinal segments;

c. heat treating the steel to develop an appropriate metallurgical structure;

d. separating the segments into individual filaments or ribbons by causing the steel to fracture at the channels or grooves; and e. passing the filaments or ribbons through a mechanical straightener.

The product produced by this invention can be used as a reinforcing member in rubber composites such as tires, hoses and conveyor belts. Such a reinforcing member must exhibit specific mechanical properties. These properties are imparted to the member by performing a heat treatment step as hereinafter more fully discussed.

If the ribbon is to be employed as a reinforcing member a desirable property is fatigue resistance. This property is imparted to the product by controlling the steel microstructure and the fracture mode by which the ribbon is separated from the scored steel coil. It is well known in the art that the contour of a fracture surface has a significant effect on fatigue life. By controlling the mode of fracture fatigue resistance can be improved. As hereinafter more fully discussed fatigue resistance is further improved by mechanically straightening the separated segments. Another important property of steel for reinforcing applications is straightness. That is, when the ribbon is unwound from a package or spool it should lie straight and not have any twist or curliness. For instance, a 20 foot (6.1 meters) length of ribbon must not deviate more than 3 inches (7.62 cm) from a straight line.

The production of essentially straight ribbon or filament according to the present invention is accomplished in the following manner.

Steel strip in cold rolled gage thickness generally less than 20 mils (0.0508 cm) is provided. It has been found particularly advantageous to provide steel in black plate gage thickness, that is, less than No. 29 gage, 0.0141 inches (0.0368 cm) thick. Steel of this thickness is used because the product of this invention has found suitable applications as a reinforcing member in rubber articles such as pneumatic tires.

The steel should have a chemical composition containing about 0.30 percent to about 0.95 percent carbon, in weight percent. This amount of carbon is necessary in order that the steel will have sufficient response to austenitization and quenching thereby producing a martensitic structure. The microstructure of the starting material is pearlitic which is the optimum microstructure to insure satisfactory scoring and an adequate response to subsequent heat treatment as hereinafter more fully discussed.

Steel with the requisite analysis and microstructure is then scored by feeding it into specially designed rolls. As used herein in the term "scoring" means that step in the inventive process wherein continuous, longitudinal channels or grooves are placed into the steel surface. There are two techniques disclosed herein for scoring steel.

Figure 2:
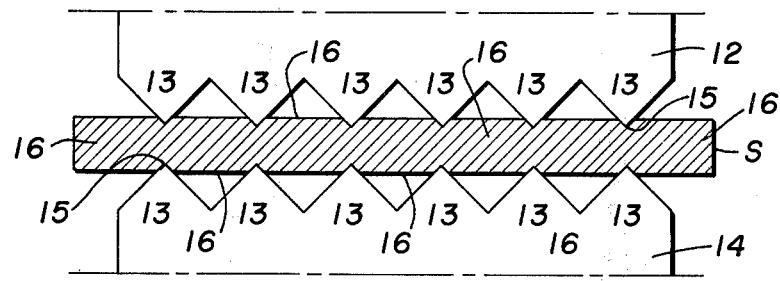
FIG. 2 is a front elevational view showing a pair of performing rolls forming a series of "V" grooves in the cross-section of steel strip.

As shown in FIGS. 1 and 2 a steel coil "S" is fed into a pair of rotating rolls. With reference to FIG. 1 rolls 2 and 4 form a series of parallel channels in the steel. Rolls 2 and 4 can be monolithic cutter rolls as described in co-pending patent application, Ser. No. 519,173 filed Oct. 30, 1974, and such disclosure is herein incorporated by reference. These rolls can also be knives, shims and spacers stacked on an arbor, and such an arrangement is well known in the slitting art. As shown in FIG. 1, the cutters have lands 3 adjacent grooves 5. As the cutters rotate the lands and grooves cooperate with each other forming a series of parallel channels 6 extending longitudinally in a continuous manner throughout the coil. Cutter engagement "e" controls the depth of the channels.

FIG. 2 shows an embodiment for forming grooves on the surfaces of strip "S". In this embodiment a pair of preforming rolls 12 and 14 contain grooving means 13, a plurality of predetermined spaced 90° angle V's formed on the periphery of each roll. As the rolls rotate the strip is fed into the nip of the rolls and the grooving means produce a series of grooves 15 that define continuous longitudinal segments 16.

After delineation of the individual segments, the steel coil is heat treated to develop an appropriate metallurgical structure. The scored steel is continuously passed into a furnace at a predetermined speed containing a protective or inert atmosphere and austenitized. After austenitization and homogenization the steel is quenched whereupn austenite transforms into martensite, bainite and/or mixtures thereof. The resultant transformation products are dependent upon the quench rate.

In the case of transformation to martensite the quenched steel is continuously tempered by heating the steel at a lower temperature, i.e. 200° – 300° C. Tempering restores ductility, removes stresses imparted by quenching and renders the product more useful. The tempering step may be conducted before or after the steel is separated into filaments. The resultant microstructure is tempered martensite, bainite or mixtures thereof. These microstructure result in desirable strength levels in the range of 250 to 400 ksi (176 – 281 kg/m$^2$). Furthermore a microstructure of martensite or one of martensite and bainite lends itself to final separation of the scored coil into individual filaments in a manner as will be hereinafter more fully discussed.

FIGS. 1 and 2 therefore define two different techniques for delineating longitudinal segments on steel strip. The purpose of providing channels or grooves is to generate line discontinuities or stress risers parallel to the length of the strip. Pearlitic steel is used because it has the optimum microstructure for scoring and response to heat treatment.

Figure 3:
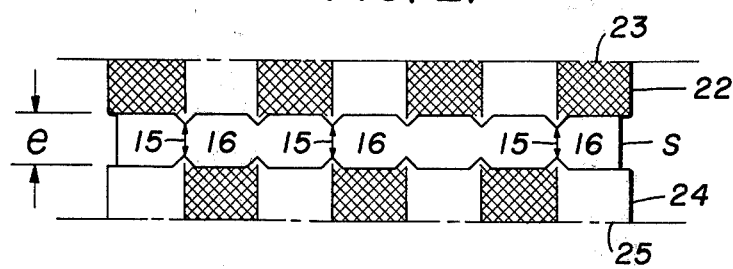
FIG. 3 is a front elevational view showing a grooved steel strip being fractured by a pair of cutters.
Figure 4:
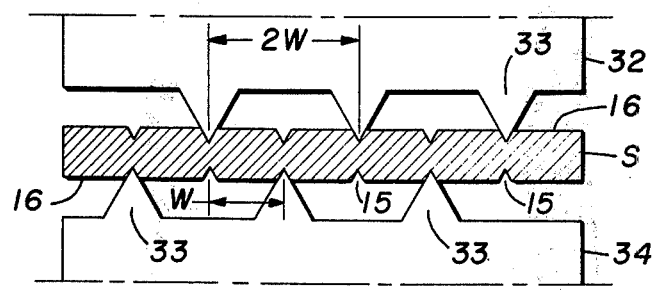
FIG. 4 is a front elevational view showing a grooved steel strip being fractured by a pair of grooved rolls.
Figure 5:
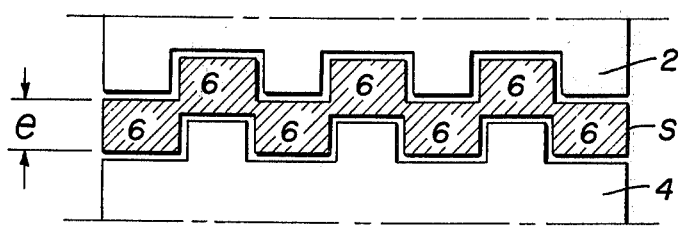
FIG. 5 is a front elevational view showing a channelled steel strip being fractured by a pair of cutters.

FIGS. 3 – 5 illustrate three different techniques for separating these delineated segments into filaments. In FIG. 3 the strip obtained from the preforming rolls 12 and 14 is fractured into a plurality of segments 16 by rolls 22 and 24. These rolls can be monolithic rolls such as rolls 2 and 4 or stacked knives, shims and spacers as previously described. By controlling engagement "e" strip S will fracture by shear through the grooves 15. The separated filaments will have a slight burr and care must be exercised in order to align the grooved strip properly between the rolls 22 and 24 thereby insuring satisfactory separation of the segments. Once again it is the co-action of lands 23 and grooves 24 on the strip that results in the separation of the strip segments into the prescribed filaments.

FIG. 4 illustrates another technique for separating the segments obtained by the prescribing of strip S in FIG. 2. The strip is separated into a plurality of equal filaments each defined by width "w". A pair of separating rolls 32 and 34 are provided with a series of V's 33 wherein the V's are spaced apart a distance of 2 $w$. Spacing the V's in such a manner provides a V for every other groove 15. Placing a V in alternate grooves on the top and on the bottom of the strip enables the prescribed strip segments to fracture into filaments 16 by bending. The advantage to separating the segments in this manner provides filaments with little if any burr formation.

FIG. 5 illustrates a third technique for separating the segments. In this embodiment a strip containing a plurality of longitudinal channels as produced by the rolls in FIG. 1 is separated by employing the same rolls. A plurality of segments 6 are obtained by changing engagement "e". As the engagement between cutters 2 and 4 increases segments 6 become more unitary in nature until the material joining them together is finally severed. Separation occurs in the shear mode resulting in separate, discrete filaments.

The final separated filaments are characterized by relatively smooth, planar, fracture surfaces. Separation induces a certain amount of cold work and residual stresses along the fracture surfaces. These stresses cause the filaments to assume a helix or curly configuration when the filaments are unwound from a package or bobbin. The separated filaments at this stage of processing would not satisfy the straightness requirements for a steel reinforcing member.

cm) and 80 mil (0.2032 cm) produced an essentially straight product.

The final properties of this ribbon are as follows:

| Condition | Ultimate Tensile Strength | | Yield Strength | | Elongation | FEL | |
|---|---|---|---|---|---|---|---|
| | ksi | kg/m² | ksi | kg/m² | | ksi | kg/m² |
| As-slit | 327 | 229 | 281 | 197 | 3.2 | 70-112 | 49-78 |
| Slit and Straightened 40 mil roll engagement | 331 | 223 | 290 | 203 | 3.0 | 140 | 98 |
| Slit and Straightened 80 mil roll engagement | 337 | 226 | 295 | 207 | 3.0 | 145 | 102 |

To remove the affects of separating the filaments and achieve an essentially straight reinforcing member the filaments are mechanically straightened. This straightening is accomplished by pulling the filaments under tension through two rows of several small-diameter horizontal rolls, each mounted in a housing so that the top and bottom rolls are offset. By controlling roll engagement and filament tension virtually all vestiges of distortion and curliness can be eliminated.

Mechanical straightening filaments has yielded an unexpected result, namely, an improved fatigue endurance limit. Two 10 mil × 40 mil (0.0254 cm × 0.1016 cm) ribbons were obtained in a manner taught by this invention. One filament was mechanically straightened and exhibited an FEL of 140 ksi (98 kg/m²). The second filament was not mechanically straightened and exhibited an FEL of 70 - 112 ksi (49 - 78 kg/m²).

The following representative example clearly illustrates the method of this invention:

Starting Material

A 2,500 lb. coil, 0.010 inch thick by 24 inches (1,135 kg, 0.0254 cm × 61 cm) wide having a nominal analysis of C 1060 and a strip microstructure of fine pearlite. This coil was rough slit into 1.0 inch (2.54 cm) wide multiples and then reslit into 0.100 inch (0.254 cm) wide strips.

Pre-scribing to form a plurality of segments

The 0.100" (0.254 cm) wide strips were passed between a pair of rolls as shown in FIG. 1. Segments 0.040" (0.1016 cm) wide were delineated. The engagement "e" between the two rolls is minus 0.005", (0.0127 cm) that is, the two rolls are spaced apart 0.005" (0.0127 cm).

Heat Treating

The prescored strips were continuously austenitized at 760° – 770° C. by passing the steel through a furnace at 87 feet per minute (26 meters per minute) and quenched in hot water at 80° C. The strip was then tempered at 265° C. and the resultant microstructure was tempered martensite.

Separating the strip into filaments

The heat-treated prescored strip was passed between the same rolls used in the preforming step. Engagement was increased to −0.002" (0.0508 cm) and the strip separated into 0.010 inch × 0.040 inch (0.0254 cm × 0.1016 cm) ribbon.

Straightening the final ribbon

The separated ribbon was extremely curly and would not lie straight. It was mechanically straightened in a roll straightener. Roll engagement at 40 mil (0.1016

Although the present invention has been described and illustrated in connection with certain preferred embodiments, it is to be understood that modifications and variations may be resorted to without departing from the spirit of the invention, as those skilled in this art will readily understand. Such modifications and variations are considered to be within the scope of the present invention as defined by the appended claims.

We claim:
1. A method for producing continuous lengths of high strength steel filaments, comprising the steps of:
   a. providing a steel coil having a carbon content from about 0.30 to about 0.95, percent by weight,;
   b. scoring the surface of said steel to form a plurality of grooves that delineate continuous longitudinal segments;
   c. heat treating said steel to develop an appropriate metallurgical structure;
   d. separating said segments into individual filaments by causing said steel to fracture at said grooves; and
   e. passing said filaments through a mechanical straightener.
2. The method of claim 1 wherein said coil thickness is less than 0.020 inches (0.0508 cm).
3. The method of claim 1 wherein said coil thickness is less than 0.0141 inches (0.0368 cm).
4. The method of claim 1 wherein said provided steel has a pearlitic microstructure.
5. The method of claim 1 wherein said scoring comprises feeding said steel into a pair of rotating rolls.
6. The method of claim 5 wherein said rolls are a pair of engaged cutters that form longitudinal channels in said steel.
7. The method of claim 5 wherein said rolls have a plurality of predetermined spaced V's formed along the periphery of each roll.
8. The method of claim 1 wherein said heat treating comprises austenitizing and quenching said steel to form martensite, bainite and mixtures thereof.
9. The method of claim 5 wherein said segments are separated by feeding said steel into a pair of engaged cutters.
10. The method of claim 7 wherein said segments are separated by feeding said steel into a pair of rolls having a plurality of V's spaced along their surfaces so that a V is placed into alternate grooves on the top and bottom surfaces of said steel and each segment contains only one V.
11. The method of claim 1 wherein said steel is tempered.
12. The method of claim 11 wherein said tempering is conducted before separation of the segments.
13. The method of claim 11 wherein said tempering is conducted after separation of the segments.

* * * * *